United States Patent [19]

Sawamoto

[11] Patent Number: 5,287,475
[45] Date of Patent: * Feb. 15, 1994

[54] DATA PROCESSING APPARATUS OPERABLE IN EXTENDED OR UNEXTENDED VIRTUAL ADDRESS SPACES WITHOUT SOFTWARE MODIFICATION

[75] Inventor: Hideo Sawamoto, Hadano, Japan
[73] Assignee: Hitachi, Ltd., Tokyo, Japan
[*] Notice: The portion of the term of this patent subsequent to Jun. 11, 2008 has been disclaimed.
[21] Appl. No.: 664,099
[22] Filed: Mar. 4, 1991

Related U.S. Application Data

[63] Continuation of Ser. No. 252,815, Oct. 3, 1988, Pat. No. 5,023,777.

[30] Foreign Application Priority Data

Oct. 5, 1987 [JP] Japan .................. 62-250913

[51] Int. Cl.[5] .................. G06F 12/08; G06F 12/00
[52] U.S. Cl. .................. 395/425; 395/400; 395/800; 364/DIG. 1
[58] Field of Search ... 364/200 MS File, 900 MS File; 395/425, 400, 800

[56] References Cited

U.S. PATENT DOCUMENTS

| | | | |
|---|---|---|---|
| 3,854,126 | 12/1974 | Gray et al. | 364/200 |
| 4,340,932 | 7/1982 | Bakula et al. | 364/200 |
| 4,388,685 | 6/1983 | Koyok et al. | 364/200 |
| 4,769,770 | 9/1988 | Miyadera et al. | 364/200 |
| 4,777,589 | 10/1988 | Boettner et al. | 364/200 |
| 4,792,895 | 12/1988 | Tallman | 364/200 |
| 4,792,897 | 12/1988 | Gotou et al. | 364/200 |
| 4,816,991 | 3/1989 | Watanabe et al. | 364/200 |
| 4,843,541 | 6/1989 | Bean et al. | 364/200 |
| 4,849,875 | 7/1987 | Fairmen et al. | 364/200 |
| 4,926,322 | 5/1990 | Stimac et al. | 364/200 |
| 4,991,083 | 2/1991 | Aoyama et al. | 364/200 |

OTHER PUBLICATIONS

"IBM System/370 Extended Architecture Principles of Operation" Publication No. SA22-7085-1, File No. S370-01, Copyright by International Business Machines Corporation, 1983, 1987, pp. 3-21 to 3-38.

*Primary Examiner*—Thomas C. Lee
*Assistant Examiner*—L. Donaghue
*Attorney, Agent, or Firm*—Fay, Sharpe, Beall, Fagan, Minnich & McKee

[57] ABSTRACT

An information processing system having an address expansion function without a need for increasing the number of virtual address overhead is disclosed. An extended address portion is stored in one of a plurality of registers which are selectable responsive to an instruction executed by the system when accessing an operand. A table having entries of segment table origins STOs is disposed in a main memory and is read by using the content of the selected register to obtain a segment table origin STO. An address translation of the virtual address is performed, based on the obtained STO.

9 Claims, 4 Drawing Sheets

FORMAT OF SEGMENT TABLE ENTRY

FORMAT OF DOMAIN TABLE ORIGIN REGISTER

FORMAT OF DOMAIN TABLE ENTRY

FORMAT OF EXTENDED PAGE TABLE ENTRY

DATA PROCESSING APPARATUS OPERABLE IN EXTENDED OR UNEXTENDED VIRTUAL ADDRESS SPACES WITHOUT SOFTWARE MODIFICATION

This application is a continuation application of U.S. Ser. No. 252,815, filed Oct. 3, 1988, now U.S. Pat. No. 5,023,777.

BACKGROUND OF THE INVENTION

The present invention relates to an information processing apparatus having an address extension function, and more particularly to an information processing apparatus capable of extending an address space while keeping compatibility with already developed softwares.

In a current general purpose computer architecture, an instruction counter, general registers and the like all of 31 bits or 32 bits are generally used. Softwares have been developed also on the basis of 31 bit address. A general purpose computer architecture of this type is discussed, for example, in IBM System 370 Extended Architecture Principles of Operation, SA22-7085-1, 1987, pp 3-21 to 3-38.

Data amount to be processed has increased nowadays, and both virtual and real addresses of 31 bits or more have become necessary. In configuring a new architecture with 31 or more bit addresses, it is important to keep compatibility with those architectures with 31 bit addresses already developed. Namely, it is necessary for an information processing apparatus of a new architecture to be capable of using softwares with 31 bit addresses without any modification.

SUMMARY OF THE INVENTION

It is an object of the present invention to provide an information processing apparatus with address extended architecture and function capable of using softwares developed before the address extension.

In an information processing apparatus, an instruction or data is read using a real address which has been translated from a virtual address obtained by an address generator, i.e., an address adder. A virtual address generally has a segment index, page index and byte index. A segment table origin which is address that designates the beginning of a segment table is added to a segment index. Based on the added result, a page table origin of the segment table which is one of address translation table is obtained. Then, the page table origin, i.e., the start address of a page table which is another address translation table is added to the page index to obtain a page frame real address from the page table. The page frame real address is concatinated with the byte index to obtain a real address.

According to the information processing apparatus of this invention, in order to extend an address space, there is provided a domain index as a higher index of a segment index of the address before the extension, which address is expressed by the segment index, page index and byte index. The domain is a space which is addressed by the address before the extension, and the extended address space consists of multiple domain. There are further provided in the address translation table a domain table, and a domain table designation register which contains the domain table origin. The domain table entry contains the segment table origin. In translating a virtual address into a real address, a domain table origin representing the start address of a domain table is added to a domain index to obtain a domain-table entry address and the entry fetched from the domain table contains the segment table origin in the domain table. Thereafter, the virtual address is translated in the same manner as the case where an address space is not extended.

The information processing apparatus is provided with domain registers for storing domain indexes of an address for an instruction or an operand. Address adders perform address addition for an address before the extension. The contents of the domain registers are set at "0" in case where an address extension is not made. If the content of a domain register is "0", a virtual address outputted from the address adder is translated into a real address in the same manner as conventional. If the content of a domain register is not "0", the virtual address obtained from the address adder is translated into a real address using the segment table origin obtained from the domain table.

The content of a domain register is set by the information processing apparatus, or in the case of address extension the content is sometimes incremented in accordance with the result of address addition. The information processing apparatus is provided with means for storing information based on which the address extension for an instruction and/or an operand is discriminated. If a carry is outputted from the address adder, the carry is neglected, whereas in the case where address extension is made, the content of the domain register is incremented by 1.

If a translation look-aside buffer (TLB) which entry generally contains segment table origin, whole or part of segment index and page index, and page frame addresses is to be used in the information processing apparatus of this invention, TLB further stores domain indexes, and domain table origins in place of segment table origins. In comparing the stored contents in TLB with a virtual address to be translated, the content of a domain register and a domain index field of the TLB entry are compared with each other even when address extension is not made.

According to the present invention, although the quantity of additional hardware is small, including such as additional domain registers, address extension can be easily controlled while keeping compatibility with presently used architectures and softwares.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENT

An embodiment of the present invention will now be described with reference to the accompanying drawings.

In the present embodiment, an instruction domain register (IDR) and operand domain registers (ODRj) are all of 16 bit configuration. ODRs include a first operand ODR1 (j=1) and a second operand ODR2 (j=2).

Figure 1:
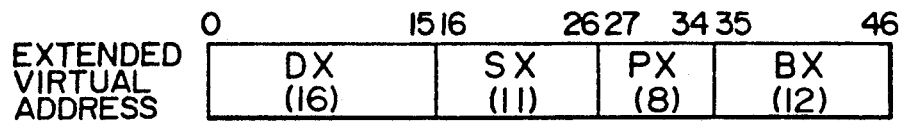
FIG. 1 shows the format of an extended virtual address according to this invention.

FIG. 1 shows the format of an extended virtual address used in this embodiment. The address is assumed to use a 47 bit configuration. 31 bits from the 16-th bit to 46-th bit are the same as the conventional 31 bit virtual address: the segment index (SX) is constructed of 11 bits, the page index (PX) is of 8 bits, and the byte index (BX) is of 12 bits. The segment size is 1M bytes, and the page size is 4K bytes. According to the present invention, an additional 16 bit domain index (DX) is added. A virtual address space of 2G byte size is called herein a virtual domain. Thus, respective ones of $2^{16}=64K$ of virtual domains are allocated in the virtual address space which is represented by 47 bits. An area represented by DX=d is called herein a virtual domain d.

Prior to giving a description of the embodiment, the address translation where address extension is not made as conventional, and where address extension is made in accordance with the present invention will be described first.

Figure 2:
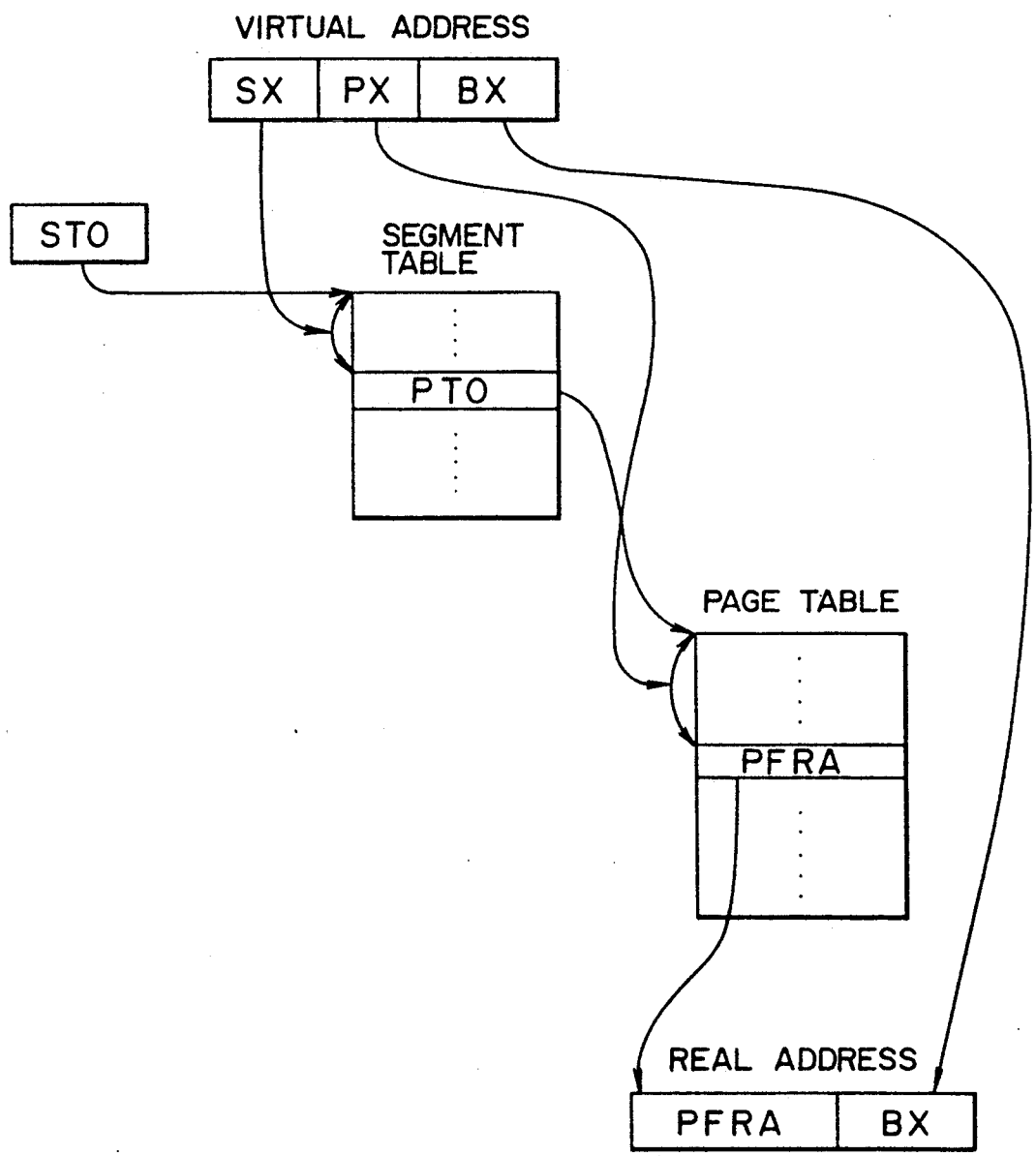
FIG. 2 illustrates a conventional address translation.

FIG. 2 illustrates the address translation where address extension is not made as conventional. A virtual address is composed of a segment index (SX), page index (PX) and byte index (BX). A segment table origin (STO) indicates the start address of a segment table. The segment table origin (STO) is added to the segment index (SX), and the resultant address is used to obtain a page table origin (PTO) from the segment table. The page table origin (PTO) indicates the start address of a page table. The page table origin (PTO) and the page index (PX) are added together, and the resultant address is used to obtain a page frame real address (PFRA) from the page table. A real address is obtained based on the page frame real address and the byte index (BX).

Figure 3:
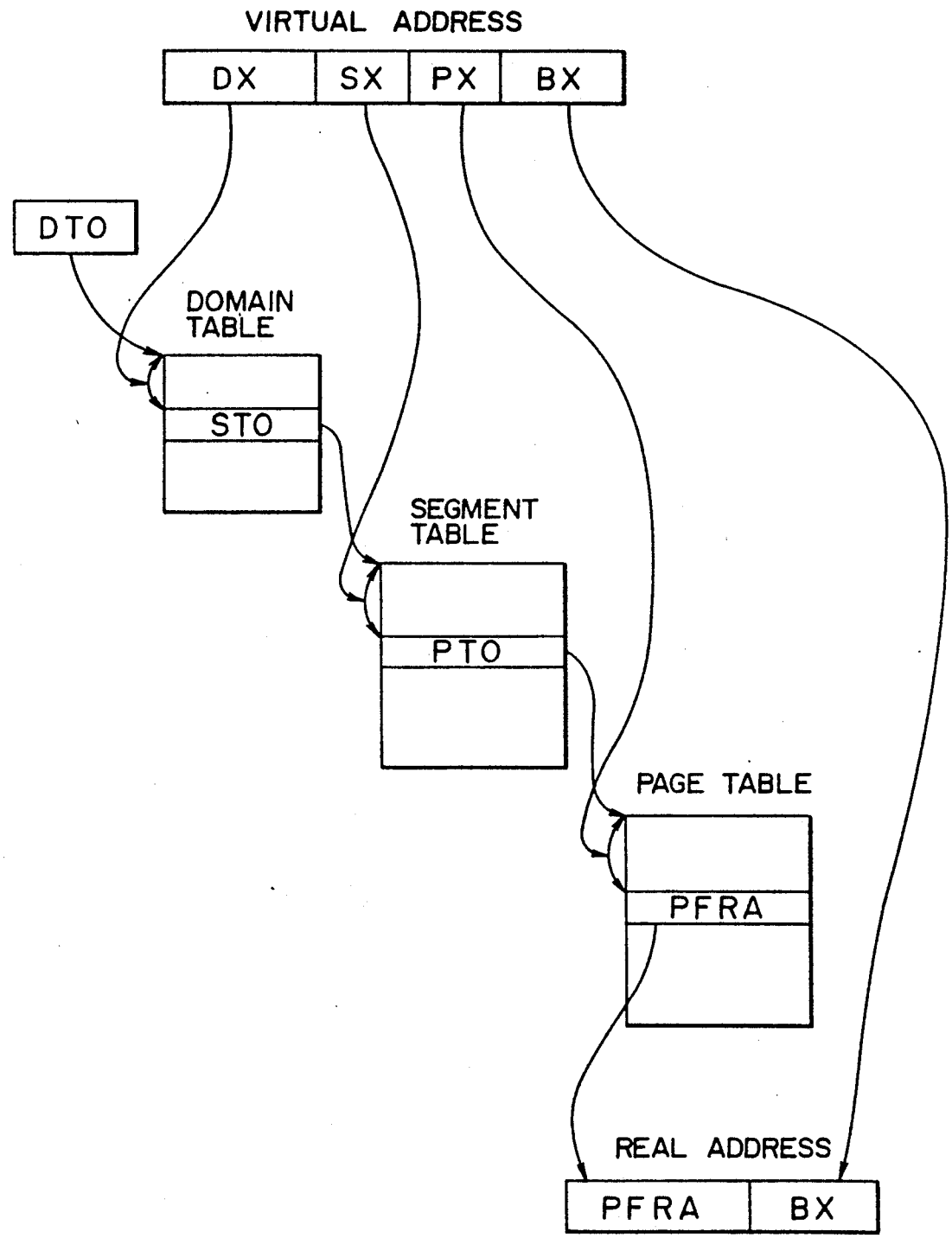
FIG. 3 illustrates an address translation with the address extension according to this invention.

FIG. 3 illustrates the address translation where address extension is made in accordance with the present invention. A virtual address is composed of, as described with FIG. 1, a domain index (DX), segment index (SX), page index (PX), and byte index (BX). A domain table origin (DTO) indicates the start address of a domain table which has been provided in the address translation table. The domain table origin (DTO) and the domain index (DX) are added together, and the resultant address is used to obtain a segment table origin (STO) from the domain table. The segment table origin indicates the start address of a segment table among a plurality of segment tables. The address translation operation after obtaining the segment table origin (STO) is the same as that described with FIG. 2, so that the description therefor is omitted. In case of the address extension, there are provided domain tables, and segment tables and page tables in correspondence with the extended space.

Figure 4:
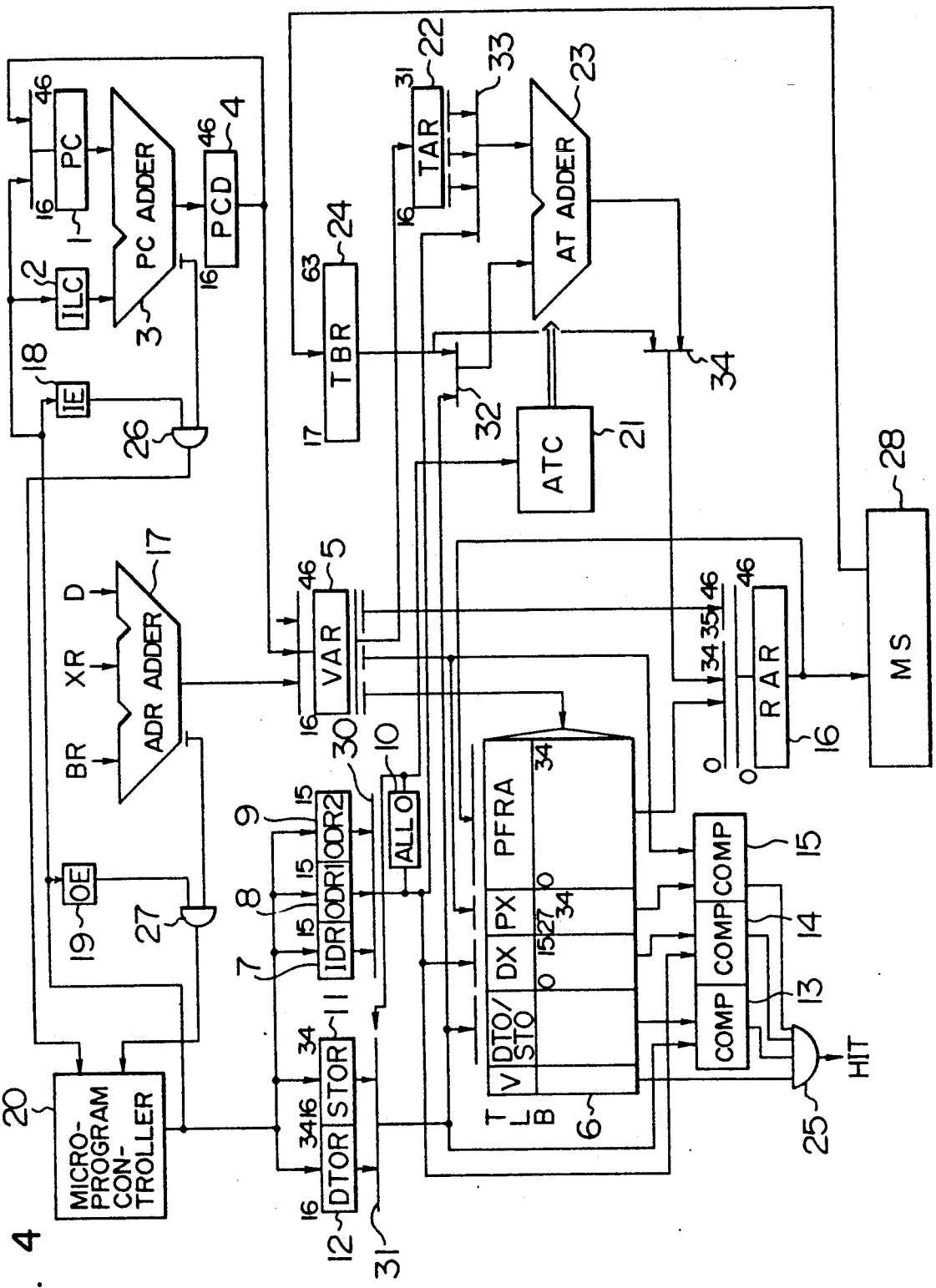
FIG. 4 is a block diagram showing an embodiment of the information processing apparatus according to the present invention.

FIG. 4 is a block diagram showing an embodiment of the information processing apparatus according to the present invention.

First, a memory access for an instruction will be described. An instruction address (31 bits) is being stored in a program counter (PC) 1, and the length of the instruction executed is being stored in an instruction length code register (ILC) 2. The contents of PC 1 and ILC 2 are added together by a PC ADDER 3 to obtain the address of an instruction to be executed next. The addition result is set in an output register (PCD) 4 and in PC 1. The description will be directed to the case where a carry is not generated at such addition operation. The content of PCD 4 is sent to a virtual address register (VAR) 5 for fetching an instruction from the memory. The virtual address set in VAR 5 is composed of the segment index (SX), page index (PX) and byte index (BX), and does not include the domain index (DX), in both the cases where address extension is made and not made. The virtual address is used to refer to an address translation buffer (TLB) 6 in translating the virtual address into a real address. In this embodiment, SX of the virtual address is used as an address to TLB 6. Each entry of TLB 6 includes a V field indicating that the entry concerned is valid; a DTO/STO field for storing a segment table origin (STO) in case where virtual domain is 0 and storing a domain table origin (DTO) in case where the virtual domain is not 0; a domain index (DX) field; a page index (PX) field, and a page frame real address (PFRA) field. The values of an instruction domain and first and second operand domains are stored in IDR 7, ODR1 8 and ODR2 9 by the information processing apparatus in accordance with the content of a program to be executed. One of the outputs from these three domain registers is selected by a selector 30 dependent upon an instruction fetch, a first operand request or a second operand request. The number or content of selected domain is checked by an all-0 detector 10 if it is 0 or not. If it is 0, a STO register (STOR) 11 is selected, and if not, a DTO register (DTOR) 12 is selected, respectively by a selector 31.

In case of an instruction fetch. IDR 7 is being selected. Comparators 13, 14 and 15 detect the coincidences between IDR 7 and Dx field of TLB 6, between STOR 11 or DTOR 12 and DTO/STO field of TLB 6, and between PX of VAR 5 and PX field of TLB 6. If all the coincidences are detected and V field of the TLB 6 is "1", then an output HIT from an AND gate 25 becomes "1". In this case, it is judged that an objective address translation pair is stored (hit) in TLB 6. Thus, the content of PFRA field of TLB 6 is set at the higher area of a real address register (RAR) 16, and the lower byte index of VAR at the lower area thereof. The real address in RAR 16 is sent to the main storage (MS) 28 to fetch an instruction.

In case where address extension is not made, a program is arranged such that a virtual address of a conventional format is set in VAR 5 to refer to TLB. Thus, a conventional address translation hardware can be used as it is.

Next, a memory request for an operand will be described. An operand address (31 bits) is obtained by adding together the contents of a base register (BR), index register (XR) and displacement (D) by an address adder (ADR ADDER) 17. The addition result is set in VAR 5. The procedure to obtain a real address with reference to TLB 6 is the same as that of the above-described instruction fetch, so the description therefor is omitted. However, only a different point from the instruction fetch is that ODR1 8 (access to the first operand) or ORD2 9 (access to the second operand) is selected in place of IDR 7.

Next, the case where a carry is generated at the address addition operation will be described. An instruction address extended mode bit (IE) 18 and/or operand address extended mode bit (OE) 19 are set at "1" where address extension of the instruction and/or the operand is made, and reset at "0" where address extension is not made, thus serving as discrimination bit. They can be set or reset by a microprogram controller (MPC) 20 upon instruction by a program. If IE 18 is "0" and a carry is outputted from PC ADDER 3, the carry is neglected. If OE is "0" and a carry is outputted from ADR ADDER 17, the carry is also neglected. On the other hand, if IE 18 is "1" and a carry is generated (an over flow occurs) from the highest (leftmost) bit at PC ADDER 3, a signal is sent via an AND gate 20 to MPC 20 to initiate an IDR renewal microprogram and add "1" to the content of IDR 7. Thus, the content of IDR 7 is incremented by "1" and the result is stored therein. In the address translation, the newly stored value in IDR 7 is used. Similarly, if OE 19 is "1" and a carry is generated from the highest bit at ADR ADDER 17, a signal is sent via an AND gate 27 to MPC 20 to initiate an ODR renewal microprogram and add "1" to ODR1 8 for the first operand access and to ODR2 9 for the second operand access. The added result in ODR1 8 or ODR2 9 is used in the address translation. Such addition is carried out by already installed MPC 20. If such addition of "1" to IDR 7, ODR1 8, or ODR2 9 results in generating a carry from the highest (leftmost) bit thereof, then a program interruption is occurred.

The information processing apparatus is provided with an instruction for reading the contents of IDR 7, ODR1 8 and ODR2 9, and an instruction for setting an arbitrary value in these registers so that reading the contents of these registers and setting an arbitrary value in these registers can be carried out by a program.

Next, address translation in the case where an objective address translation pair is not stored in TLB 6 will be described.

If a "HIT" is not gained with respect to TLB 6, an address translation adder (AT ADDER) 23 is activated by an address translation controller (ATC) 21. A signal from the all-0 detector 10 indicating if the content of the domain register IDR 7, ODR1 8, or ODR2 9 is "0" or not is being inputted to ATC 21. If the content of the domain register is "0", address translation of a conventional 31 bit architecture is performed, whereas if it is not "0", extended address translation is performed.

Figure 5:
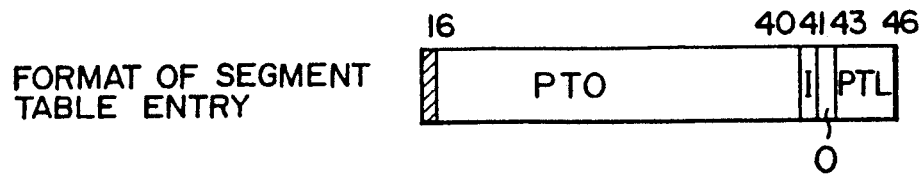
FIG. 5 shows an example of the format of a segment table entry.

First, a conventional address translation will be described. A virtual address to be address translated has been transferred from VAR 5 to a translating address register (TAR) 22. STO in STOR 11 and SX in TAR 22 are supplied via selectors 32 and 33 to an address translation adder (AT ADDER) 23 to add them together, and the added result is set in RAR 16 to address MS 28 using the content of RAR 16 and fetch a segment table from MS 28. An STO entry is set in ST in a table register (TBR) 24. The format of ST entry is shown in FIG. 5. In addition to STO, the STO entry includes an I bit representative of invalid state, and STL indicative of a segment table length. PTO of the ST entry set in TBR 24 and PX in TAR 22 are added together by AT ADDER 23, and the result is set in RAR 16 to address MS 28 using the content of RAR 16 and fetch a page table (PT) from MS 28. PFRA in the PT entry is stored via a selector 34 in RAR 16, and BX in TAR 22 is stored also in RAR 16 to thereby combine them together and obtain a real address. PFRA in RAR 16, the contents of STOR 11, and of ODR1 8 or ODR2 9, and PX in TAR 22 are registered in TLB. The V field of the entry in TLB 6 is set at "1" at this time.

As above, if the content of the domain register is "0", a conventional address translation as shown in FIG. 3 is performed so that a conventional address translation program can be used without any modification.

Figure 6:
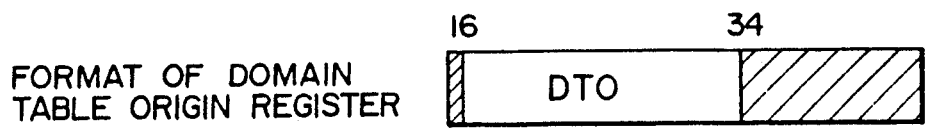
FIG. 6 shows an example of the format of a domain table origin register.
Figure 7:
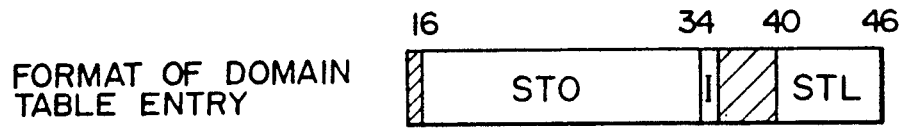
FIG. 7 shows an example of the format of a domain table entry.
Figure 8:
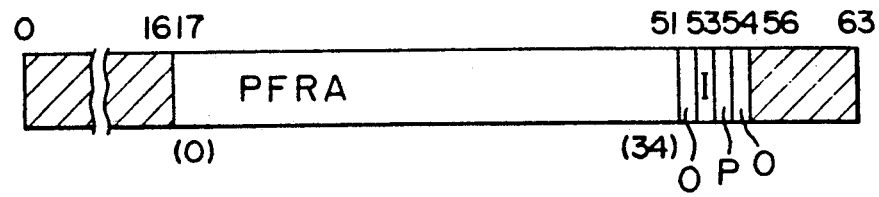
FIG. 8 shows an example of the format of an extended page table entry.

Next, extended address translation where the content of the domain register is not "0" will be described. If the content of the domain register is not "0", not STOR 11 but DTOR 12 is being selected. The format of DTOR 12 is shown in FIG. 6. DTO in DTOR 12 and a domain index from IDR 7, ODR1 8, or ODR2 9 are sent via selectors 31 and 32, and via selectors 30 and 33, to AT ADDER 23 to add them together and obtain an address of a domain table (DT). The DT entry is set in TBR 24. The format of DT entry is shown in FIG. 7 which format is configured as including an invalid bit I, added to the format of segment table (ST) designation of a conventional architecture. STO in the DT entry is used instead of STOR 11 used in a conventional address translation, to thereby perform address translation operation similar to the above-described operation. However, in this case, a conventional address translation refers to two tables ST and PT, whereas an extended address translation refers to three tables DT, ST and PT as shown in FIG. 3. Further, if the real address is also extended, PT should be extended to 8 bytes having the format as shown in FIG. 8. In this case PFRA has 35 bits. The format shown in FIG. 8 includes an φ bit, invalid bit, and page protection bit P which is used for inhibiting storage into the area indicated by PFRA if it is set at "1". DTOR 12 instead of STOR 11 is registered in TLB 6.

In the above embodiment, the extended address translation has been performed with a three table arrangement. However, a two table arrangement may be applied. Also, the size of segment and page the same as conventional has been used for the domain whose content is not "0". However, for an extended address space in excess of 2G bytes, the size of segment and page may be changed as different from the conventional one, or the concept of page may not be used to thereby make a segment as the minimum unit in paging/address translating. In such a case, the two table arrangement with DT and ST is applied.

As shown in FIG. 6, DTO is composed of 19 bits so that DT may be allocated in a real address space without real address extension. Further, ST and PT for the extended address area may be allocated in a real address space without real address extension.

An additional instruction is a load instruction to load an arbitrary value in at least IDR 7, ODR1 8 and ODR2 9. If bits not presently used in a program status word (PSW) are used, IE 18 and OE 29 can be set or reset by a load PSW (LPSW) instruction.

The above embodiment allows a use of virtual/real address space in excess of 31 bits and an extension of instruction/data address with a small number of additional hardwares. For instance, even if a virtual/real address is extended to 47 bits as described and shown, only RAR 16 and TBR 24 of the hardwares require 47 bit address, and the additional registers required are DTOR 12, IDR 7, ODR1 8, and ODR2 9, respectively of 16 bit structure, and IE 18 and OE 19 both of 1 bit. PC ADDER 3 and ADR ADDER 17 both are of 31 bit structure as conventional. Further, AT ADDER may be of 31 bit structure as conventional if the address translation table such as a domain table are allocated within the real address space for the case where the domain content is 0.

I claim:

1. An information processing apparatus with an address extension function comprising:
    address adders for performing address addition with respect to a first fraction of an address of an operand having an extended bit portion and an unextended bit portion, said first fraction corresponding to the unextended bit portion of said address;
    a virtual address register for storing a virtual address obtained by said address addition;
    a set of first registers each for storing a second fraction of said address of the operand, said second fraction corresponding to the extended bit portion of said address; and
    a main storage for storing a set of address translation tables for use in the case where address extension is not made, and an extension address translation table to be added for use in the case where address extension is made; wherein if an address is not to be extended, address translation of the content of the virtual address register is performed using said address translation tables and if an address is to be extended, address translation of the content of the virtual address register is performed using said address translation table based on the content of one of said set of first registers selected in response to an instruction executed by the information processing system.

2. A virtual address information processing system for handling an extended real address space, the system comprising:
    address register means for storing a segment table origin address and a virtual address having a translatable part and an untranslatable part, the translatable part comprising a segment index and a page index;
    a main storage for storing a segment table and a page table, the segment table being accessed by using a first n-bit address and having an entry holding a page table start address, and the page table being accessed by using a second n-bit address and having an entry holding an (n+k)-bit page frame real address wherein (k) is greater than zero;
    adder means for obtaining said first n-bit address in response to said segment table origin address stored in the address register means and the segment index of the virtual address to access the segment table and for obtaining said second n-bit address in response to said page table start address from the segment table and the page index of the virtual address to access the page table; and,
    means for accessing the main storage using said first and second n-bit addresses obtained from said adder means.

3. An information processing apparatus with an address extension function comprising:
    address register means for storing a virtual address;
    main storage means for storing a plurality of address translation tables, each table being identified by a segment table origin uniquely assigned thereto and an additional table means having a plurality of entries each containing a segment table origin;
    a plurality of second register means for storing an extended address portion of an extended virtual address, said plurality of second register means being singularly selectable by a program performed by the information processing apparatus;
    third register means for storing information comprising an origin address of the additional table in the main storage; and,
    means for selectively accessing the additional table by using a third register means and the selected second register means to obtain a segment table origin and for providing the address translation means with the obtained segment table origin from the additional table to obtain a real address.

4. A data processing apparatus for selectively executing instructions in an extended virtual address space and in an unextended virtual address space, the apparatus comprising:
    virtual address register means for storing a virtual address of an instruction therein, the virtual address comprising a segment index, a page index and a byte index;
    domain table origin register storage means for storing the start address of a domain space comprising the extended virtual address space;
    segment table origin register storage means for storing the start address of a segment space comprising the unextended virtual address space;
    a translation lookaside buffer having a i) segment table origin field for storing the start address of a segment table, ii) a domain table origin field for storing the start address of a domain table, iii) a domain table index field for storing an index into the domain table iv) a page table index field for storing an index into a page table and v) a page frame real address field for storing a portion of the real address;
    means for addressing the translation lookaside buffer at a first address using the segment index stored in the virtual address register means;
    instruction domain storage means for storing a value of a preselected instruction domain in accordance with the program executed by said data processing apparatus;
    first operand domain storage means for storing a value of a first operand domain in accordance with the program executed by said data processing apparatus;
    second operand domain storage means for storing a value of a second operand domain in accordance with the program executed by said data processing apparatus;
    selection means for selectively reading a one of either the instruction domain storage means, the first operand domain storage means or the second operand domain storage means based upon an operating state of said data processor being an instruction fetch, a first operand request or a second operand request respectively;
    comparator means for detecting coincidence, when the operating state of the data processing apparatus is an instruction fetch, between: i) the value of the preselected instruction domain in the instruction domain storage means and the index into the domain table stored in the domain table index field of the translation lookaside buffer at said first address ii) the start address of the domain space stored in the domain table origin register storage means and the start address of the domain table stored in the domain table origin field of the translation lookaside buffer at said first address, and iii) the page index stored in the virtual address register means and the index into the page table stored in the page table index field of the translation lookaside buffer at said first address;

real address register means for storing a real address; and, means for writing: i) said portion of the real address from the page frame real address field of the translation lookaside buffer at said first address and ii) said byte index from the virtual address register means to the real address register means to assemble said real address when said coincidence is detected.

5. The data processing apparatus according to claim 4 wherein said comparator means further comprises means for detecting coincidence, when the operating state of the data processing apparatus is a first operand request, between the value of the first operand domain in the first operand domain storage means and the index into the domain table stored in the domain table index field of the translation lookaside buffer at said first address.

6. The data processing apparatus according to claim 5 wherein said comparator means further comprises means for detecting coincidence, when the operating state of the data processing apparatus is a second operand request, between the value of the second operand domain in the second operand domain storage means and the index into the domain table stored in the domain table index field of the translation lookaside buffer at said first address.

7. The data processing apparatus according to claim 4 further comprising second selection means for selecting a one of said start address of the domain space comprising the extended virtual address space from said domain table origin register storage means and the start address of the segment space comprising the unextended virtual address space from said segment table origin register storage means based upon the value of the preselected instruction domain stored in said instruction domain storage means, the value of the first operand domain stored in said first operand domain storage means, and the value of the second operand domain stored in said second operand domain storage means.

8. The data processing apparatus according to claim 7 wherein said comparator means further comprises means for detecting coincidence, when the second selection means selects the start address of the segment space comprising the unextended virtual address space, between the start address of the segment space stored in the segment table origin register storage means and the start address of the segment table stored in the segment table origin field of the translation lookaside buffer at said first address.

9. The data processing apparatus according to claim 4 further comprising microprogram controller means for executing a renewal program to selectively update ones of said start address of the domain space comprising the extended virtual address space, said start address of the segment space comprising the unextended virtual address space, said value of the preselected instruction domain, said value of the first operand domain, and said value of the second operand domain in accordance with the program executed by said data processing apparatus.

* * * * *